(12) United States Patent
Shimada et al.

(10) Patent No.: US 7,733,759 B2
(45) Date of Patent: Jun. 8, 2010

(54) OPTICAL PICKUP AND OPTICAL DISC APPARATUS

(75) Inventors: Kenichi Shimada, Yokohama (JP); Katsuhiko Izumi, Kamakura (JP)

(73) Assignee: Hitachi Media Electronics Co., Ltd., Oshu-shi, Iwate (JP)

( * ) Notice: Subject to any disclaimer, the term of this patent is extended or adjusted under 35 U.S.C. 154(b) by 728 days.

(21) Appl. No.: 11/588,503

(22) Filed: Oct. 26, 2006

(65) Prior Publication Data

US 2007/0097811 A1 May 3, 2007

(30) Foreign Application Priority Data

Oct. 28, 2005 (JP) ............................. 2005-313689

(51) Int. Cl.
*G11B 7/135* (2006.01)
(52) U.S. Cl. ................................. 369/112.24
(58) Field of Classification Search ........................ None
See application file for complete search history.

(56) References Cited

U.S. PATENT DOCUMENTS

| 5,726,436 | A | 3/1998 | Oka et al. | |
| 6,167,018 | A * | 12/2000 | Morimoto et al. | 369/112.17 |
| 6,798,581 | B2 * | 9/2004 | Yamamoto et al. | 359/637 |
| 2003/0063529 | A1 | 4/2003 | Iwata et al. | |
| 2004/0264343 | A1 | 12/2004 | Hendriks et al. | |

FOREIGN PATENT DOCUMENTS

| JP | 10-083555 A | 3/1998 |
| JP | 10-228665 A | 8/1998 |
| JP | 2000-040249 | 2/2000 |
| JP | 2002-015435 A | 1/2002 |
| JP | 2002-140831 | 5/2002 |
| JP | 2003-317308 A | 11/2003 |
| JP | 2004-133168 | 4/2004 |

OTHER PUBLICATIONS

State Intellectual Property Office of China (SIPO) office action dated Jan. 4, 2008 for patent application CN2006-101376749.
Japan Patent Office (JPO) office action for JPO patent application JP2005-313689 (Jan. 19, 2010).

* cited by examiner

*Primary Examiner*—Wayne R Young
*Assistant Examiner*—Brian Butcher
(74) *Attorney, Agent, or Firm*—Townsend and Townsend and Crew LLP

(57) ABSTRACT

An optical system is disclosed including an optical pickup having a wavefront aberration-correcting element capable of correcting coma aberration and astigmatism, and an optical disc apparatus which uses the optical pickup. The optical pickup includes a laser light source for irradiating an optical disc with a light beam; an objective lens for focusing the light beam on the optical disc; a lens for correcting astigmatism; a second lens for correcting coma aberration; and a photodetector for receiving the light beam reflected from the optical disc. The astigmatism and the coma aberration are corrected independently of each other.

18 Claims, 10 Drawing Sheets

OPTICAL PICKUP AND OPTICAL DISC APPARATUS

BACKGROUND OF THE INVENTION

The present invention relates to an optical pickup and an optical disc apparatus having a mounted optical pickup. The problems concerning wavefront aberrations such as coma aberration, astigmatism, and spherical aberration occur when beams of light are focused on an optical disc. JP-A No. 2000-40249 discloses a technique for reducing the wavefront aberrations of the light beams. In the technique of JP-A No. 2000-40249, wavefront aberrations are corrected by assigning a required phase difference to the light beams that pass through a liquid crystal element disposed in the optical path of an optical pickup.

JP-A No. 2002-140831 discloses another technique for reducing wavefront aberrations of the light beams. In the technique of JP-A No. 2002-140831, an aberration-correcting optical system for correcting coma aberration and spherical aberration is disposed in the optical path of an optical pickup.

SUMMARY OF THE INVENTION

For the technique described in JP-A No. 2000-40249, however, the cost cannot be reduced since the liquid crystal element is expensive. In addition, since wiring for driving the liquid crystal element is added to the optical pickup, the additional wiring might require an increased number of output pins, more complex wiring, and reduced assembly efficiency. Furthermore, since various aberrations are corrected by assigning constant phase differences to the light beams and restricting those phase differences to each predefined region in the liquid crystal element, the occurrence of errors cannot be avoided. Further, since the correction is conducted in a digital fashion, a quantization error occurs.

The technique described in JP-A No. 2002-140831 facilitates only correction of the coma aberration and spherical aberration included in the wavefront aberrations of the light beams focused on the optical disc, while providing no provision for correcting the astigmatism, an aberration component that is as important as the coma aberration and spherical aberration. That is, in the technique related in JP-A No. 2002-140831, the astigmatism cannot be corrected, and the astigmatism remains in the light beams focused on the optical disc. The remaining uncorrected astigmatism may cause the recording/reproducing performance to deteriorate.

Yet another technique employs strictly managing specifications relating to the amounts of transmission wavefront aberration and reflection wavefront aberration individually for each optical component of the optical pickup. However, this conventional technique has its limits for the following reasons. As the wavelength of the light beams decreases, the number of wavefront aberrations increase in inverse proportion to the wavelength since this number is influenced by the surface roughness of the optical components, the nonuniformity in optical component shape, the anisotropy in refraction index, and other factors. Highly accurate optical components are therefore required for a Blue-ray disc system, an HD (High-Definition) DVD system, or other systems using the light beams of a 405 nm band that are even shorter in wavelength than those of current DVD systems. As a result, it is difficult to record and reproduce signals without aberration correction.

An object of the invention is to provide an optical pickup providing reduction in aberration of light beams focused on an optical disc, and an optical disc apparatus upon which is mounted an optical pickup.

To solve the above problems, an optical pickup according to the present invention includes a laser light source that irradiates an optical disc with beams of light, an objective lens that focuses the light beams on the optical disc which has been irradiated by the laser light source, a first lens that corrects astigmatism of the light beams, a second lens that corrects coma aberration of the light beams, and a photodetector that receives the light beams reflected from the optical disc. The astigmatism and the coma aberration are corrected independently of each other.

An optical disc apparatus according to the present invention includes, in addition to the above optical pickup: a servo signal generator that generates a focus error signal or a tracking error signal from a signal which is output from the optical pickup, and an information signal reproducer that reproduces an information signal recorded on the optical disc from the output signal of the optical pickup.

DESCRIPTION OF THE PREFERRED EMBODIMENTS

Embodiments of the present invention will be described below.

First Embodiment

Figure 1:
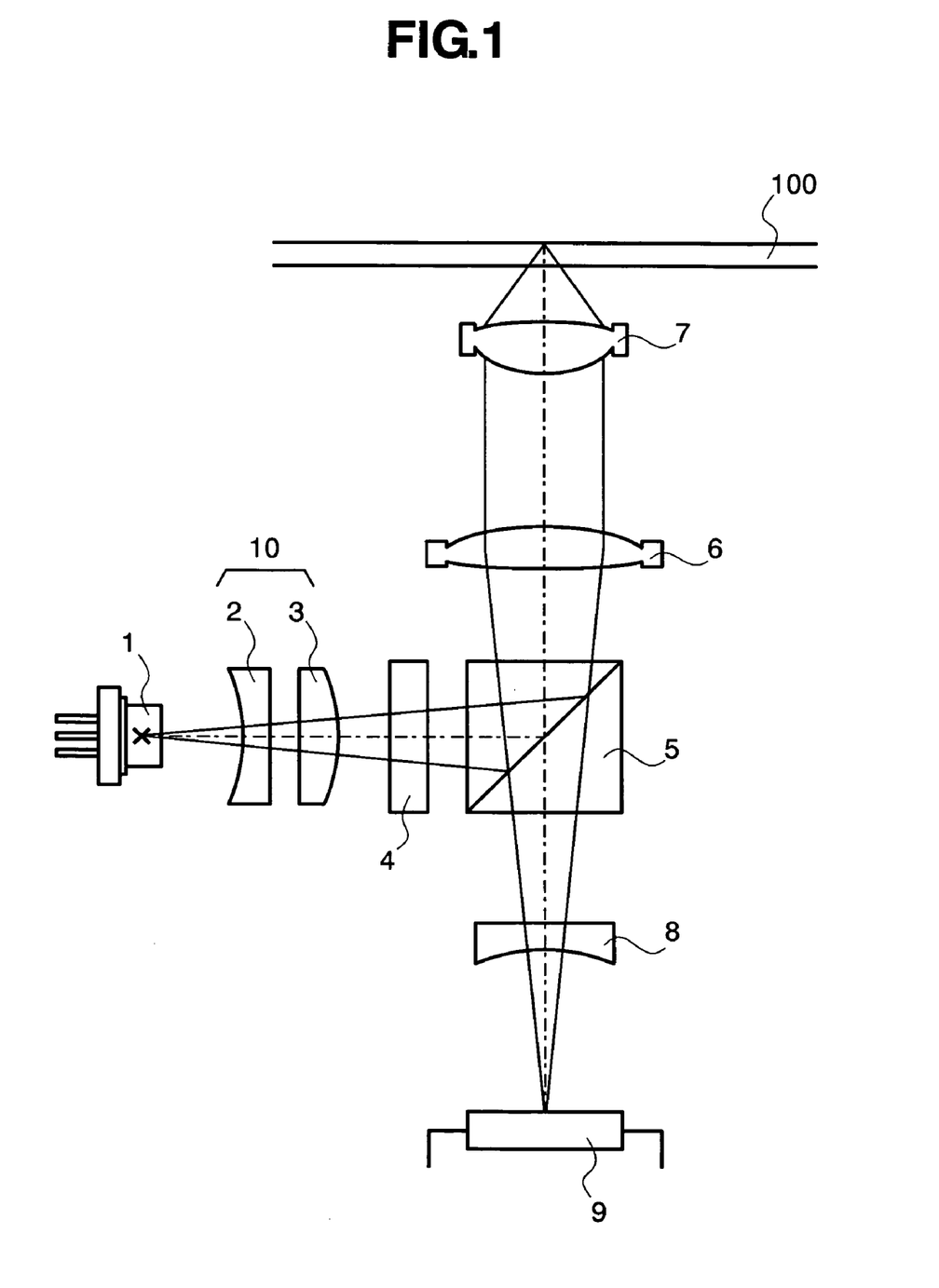
FIG. 1 is a diagram showing an optical system configuration of an optical pickup according to a first embodiment of the present invention.

FIG. 1 is a diagram showing a first embodiment of the present invention relating to an optical pickup. After being emitted from a laser diode 1, a beam of light with a wavelength "λ" passes through lenses 2 and 3 that constitute a wavefront aberration correcting element 10 (described later herein). Next, the light beam is diffracted into at least three beams of light by a diffraction grating 4 for generating three beams, and a beam splitter reflects the three beams of light.

The light beams, after being reflected by beam splitter 5, are made approximately parallel by a collimating lens 6 and then focused on an information-recording layer of an optical disc 100 by an objective lens 7. The reflected light beams that have been focused on the optical disc 100 pass through the objective lens 7, the collimating lens 6, and the beam splitter 5 in that order. After this passage of reflected light beams, astigmatism is added to the light beams such that an astigmatic focus error signal can be detected by means of a detection lens 8, and the light beams are then focused on a photodetector 9.

Figure 2A:
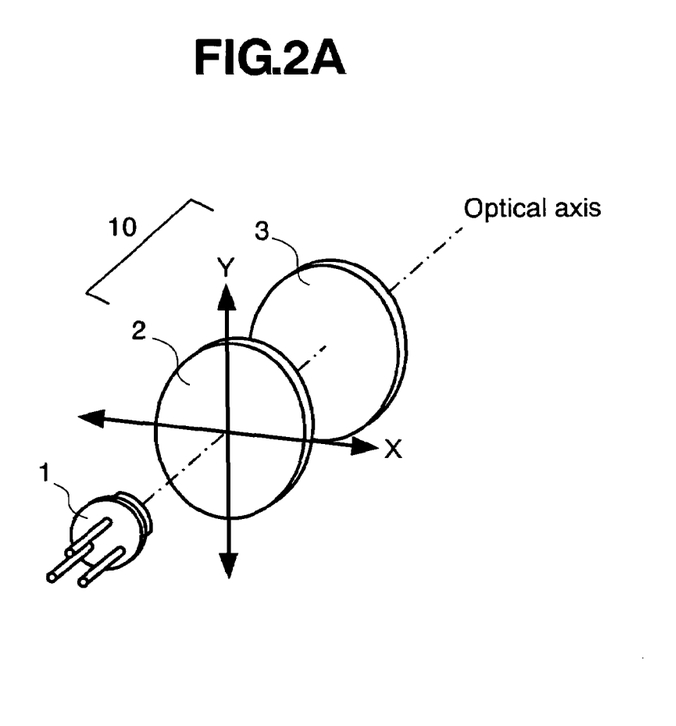
FIGS. 2A and 2B are diagrams showing a wavefront aberration correcting element according to the first embodiment.
Figure 2B:
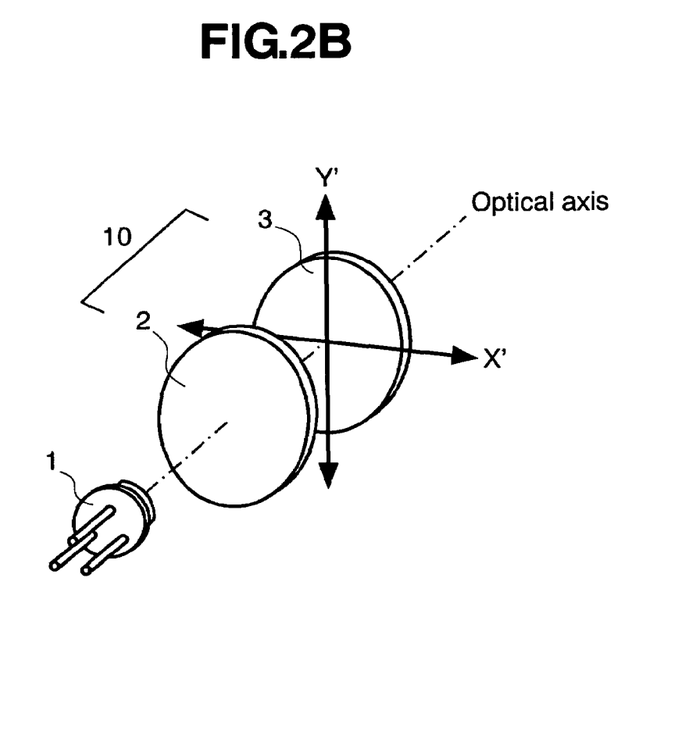

Wavefront aberration-correcting element 10 includes at least two lenses 2 and 3, the positions of which, during assembly of the optical pickup, are adjustable in any direction within a plane (formed by the X-axis and Y-axis shown in FIG. 2A, or the X'-axis and Y'-axis shown in FIG. 2B) perpendicular to an optical axis of the light beams. The positions of lenses 2 and 3 are independently adjustable.

When the lenses are moved in any direction within the plane perpendicular to the optical axis, the light beams that have passed through the lenses suffer wavefront aberrations associated with field angle characteristics of the lenses. In the present embodiment, movement of lens 2 or lens 3 in the plane perpendicular to the optical lens causes astigmatism and coma aberration, and the characteristics of lens 2 or lens 3 are respectively weighted toward acting on astigmatism or coma aberration. More specifically, with respect to the wavefront aberrations caused by moving lens 2 in the plane perpendicular to the optical axis, lens 2 has a predefined aspheric surface shape, for example, such that the astigmatism is dominant. Similarly, with respect to the wavefront aberrations caused by moving the lens 3 in the plane perpendicular to the optical axis, the lens 3 has a predefined aspheric surface shape, for example, such that the coma aberration is dominant.

Figure 3:
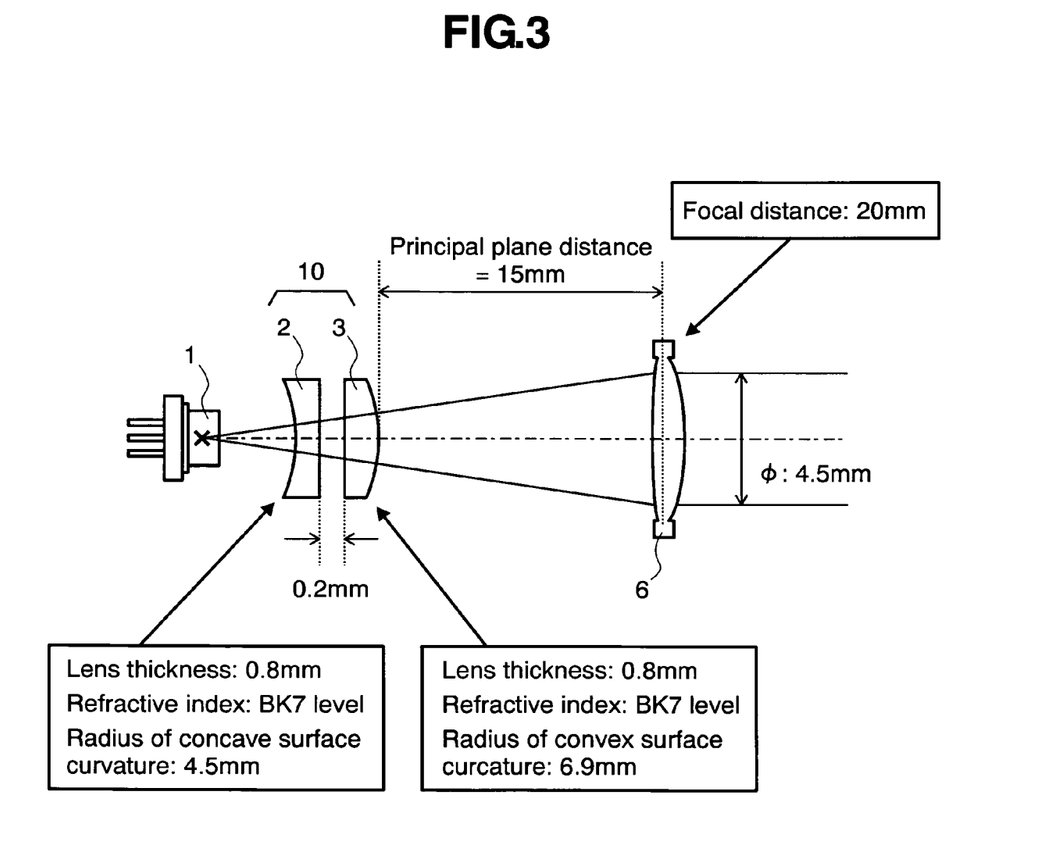
FIG. 3 is a diagram showing an example of a shape of the wavefront abberation-correcting element according to the first embodiment.
Figure 4A:
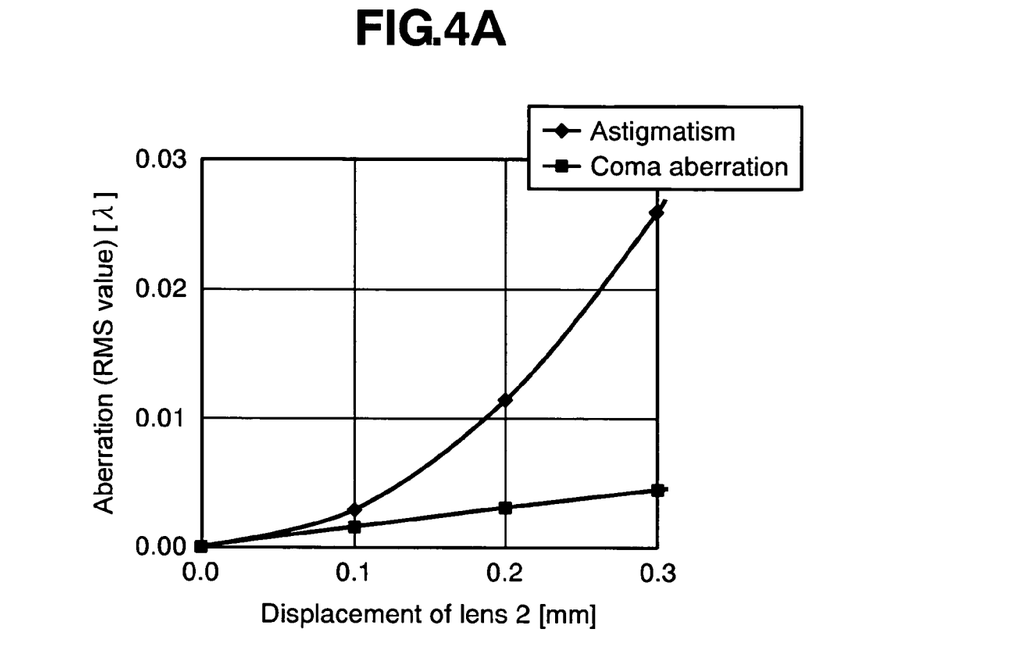
FIGS. 4A and 4B are graphs showing characteristics of a lens 2 according to the first embodiment.
Figure 4B:
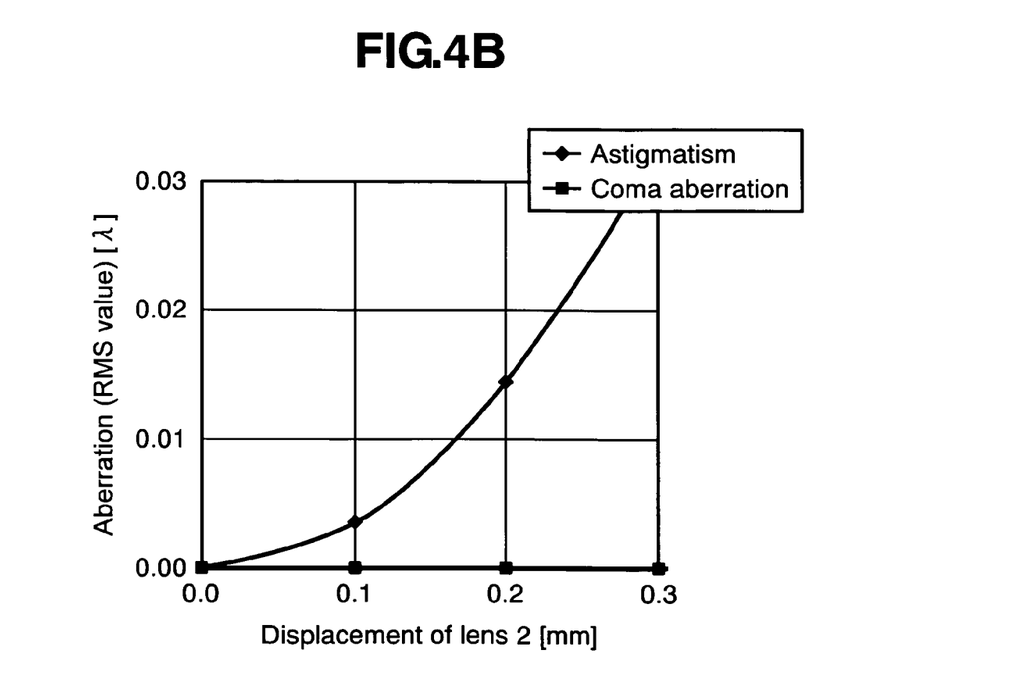

FIG. 3 shows an example of shapes of lenses 2 and 3 according to the present embodiment. In FIG. 3, one side of lens 2 is formed in a plane shape and the other side of lens 2 is formed in a concave shape, while one side of lens 3 is formed in a plane shape and the other side of lens 3 is formed in a convex shape. Radii of the curvature of the respective lens surfaces and layout of components thereon are shown in FIG. 3. Both lenses are composed of BK7, and have a refractive index of about 1.5. For convenience, diffraction grating 4 and beam splitter 5 shown in FIG. 1 are omitted from FIG. 3. FIGS. 4A, 4B are graphs that show the amounts of astigmatism and coma aberration of wavefront aberrations added to 4.5 mm diameter parallel beams of light that exit from collimating lens 6 when lens 2 is moved in a direction perpendicular to the optical axis of the light beams. In both graphs of FIGS. 4A, 4B, a horizontal axis indicates an amount of displacement of lens 2 when lens 2 is moved in a direction perpendicular to the optical axis of the light beams, and a vertical axis indicates an amount of astigmatism and an amount of coma aberration, each such astigmatism and coma aberration on which lens 2 acts when the lens is moved in that direction. If the lens 2 has a spherical concave surface, coma aberration occurs slightly as shown in FIG. 4A. If lens 2 has an aspheric concave surface and a conic constant K thereof is defined as −0.63, the amount of coma aberration can be suppressed as shown in FIG. 4B. In other words, as shown in FIG. 4B, whereas lens 2 acts almost exclusively on astigmatism, it does not act on coma aberration. The shape of lens 2 in this case is defined by the following expression:

$$Z(h) = ch^2 / [1 + \{1 - (K+1)c^2 h^2\}^{0.5}]$$

where "h" is a distance from the optical axis, "c" is a vertex curvature, that is, 1/4.5, about 0.22, and K is −0.63.

Figure 5A:
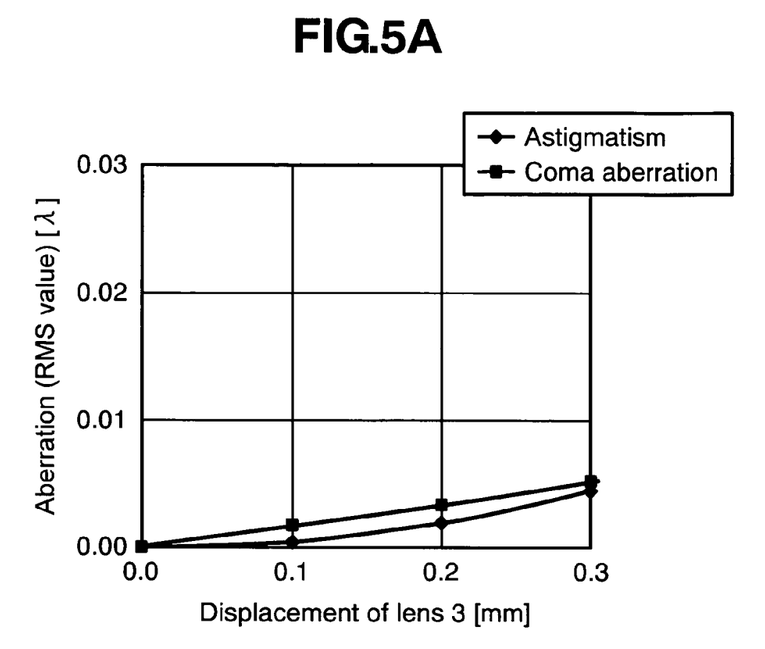
FIGS. 5A and 5B are graphs showing characteristics of a lens 3 according to the first embodiment.
Figure 5B:
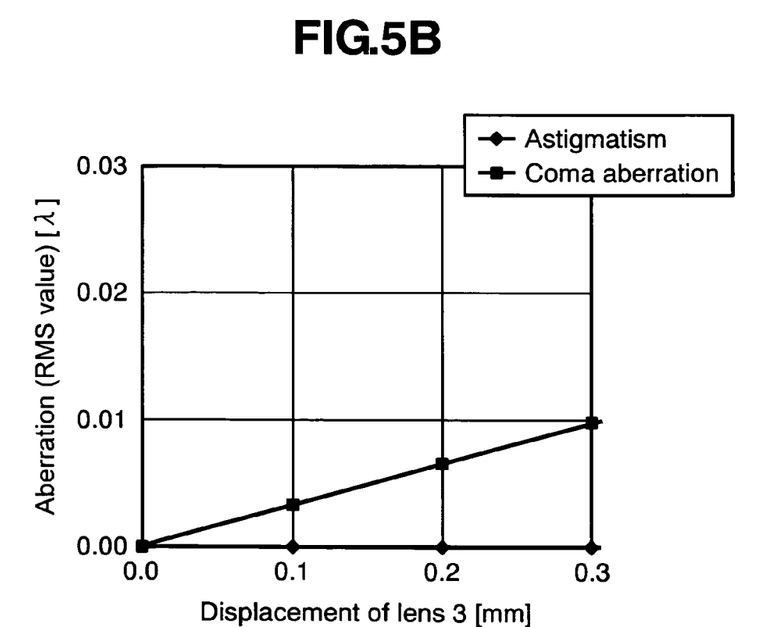

Attention will be focused on the lens 3 next. FIGS. 5A, 5B are graphs that show the amounts of astigmatism and coma aberration of wavefront aberrations added to 4.5 mm diameter parallel beams of light that exit from collimating lens 6 when lens 3, shown in FIG. 3, is moved in a direction perpendicular to the optical axis. In both graphs of FIG. 5A, 5B, a horizontal axis indicates an amount of displacement of lens 3 when lens 3 is moved in the direction perpendicular to the optical axis of the light beams, and a vertical axis indicates the amounts of astigmatism and coma aberration, each of such astigmatisms and coma aberrations on which lens 3 acts when lens 3 is moved in that direction. If lens 3 has a spherical convex surface, astigmatism and coma aberration occur at substantially the same level as shown in FIG. 5A. If lens 3 has an aspheric convex surface and a conic constant K thereof is defined as +0.67, it is possible to suppress an occurrence level of astigmatism as shown in FIG. 5B, and to make coma aberration dominantly occur. That is to say, as shown in FIG. 5B, whereas lens 3 acts almost exclusively on coma aberration, it does not act on astigmatism. The shape of lens 3 in this case is defined by the following expression:

$$Z(h) = ch^2 / [1 + \{1 - (K+1)c^2 h^2\}^{0.5}]$$

where "h" is a distance from the optical axis, "c" is a vertex curvature, that is, 1/6.9 nearly equal to 0.14, and K is equal to +0.67.

As described above, displacement of lenses 2 and 3 results in occurrence of astigmatism and coma aberration. In the case illustrated in FIG. 5B, one of the two lenses makes the occurrence of the astigmatism dominant and the other lens makes the occurrence of the coma aberration dominant. The astigmatism and coma aberration which initially remain the beams of light that have exited from collimating lens 6, for example, can therefore be efficiently corrected.

For instance, consider the operations of correcting a required occurrence level of coma aberration by moving lens 3, and then correcting a required occurrence level of astigmatism by moving lens 2. In this case, since moving lens 2 causes almost no coma aberration as shown in FIG. 4B, only the astigmatism can be corrected without affecting the coma aberration that has already been corrected using lens 3. In this way, the roles of correcting astigmatism and coma aberration are allocated to lenses 2 and 3, respectively. During assembly processes in a factory, in particular, since an element for correcting astigmatism and an element for correcting coma aberration can both be positioned manually without the need for careful attention being paid to changes in other aberration components, it is possible to obtain various advantageous effects such as process simplification, time reduction, and cost reduction.

If lens 2 has the characteristics shown in FIG. 4A, the lens acts on not only astigmatism but also coma aberration, or if lens 3 has the characteristics shown in FIG. 5A, the lens acts on not only coma aberration but also astigmatism, therefore aberration correction becomes more complicated. That is to say, for example, if the correction of astigmatism with lens 2 is followed by the correction of coma aberration with lens 3, the astigmatism recurs, which requires the repetition of the correction by moving the lens 2 or 3, and causes a vicious circle where the repetition of the correction results in recurrence of the coma aberration. Since the correcting operation needs to be performed at the factory prior to product shipment, the vicious circle reduces assembly efficiency significantly and results in increased costs.

Figure 6A:
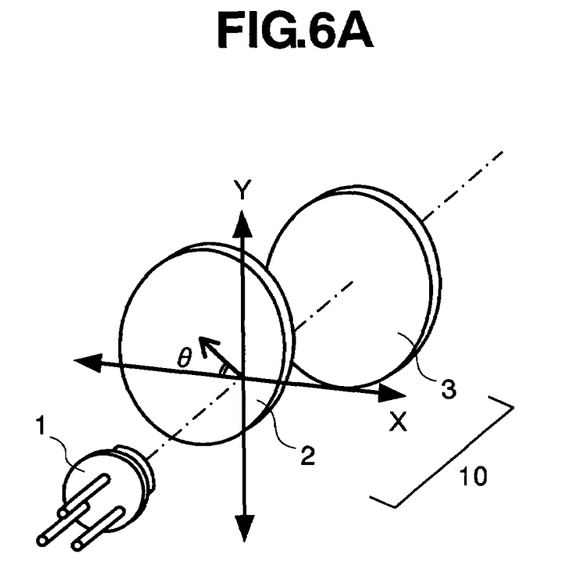
FIGS. 6A and 6B are diagrams showing position adjustment of the lenses 2 and 3 during correction of astigmatism and coma aberration.
Figure 6B:
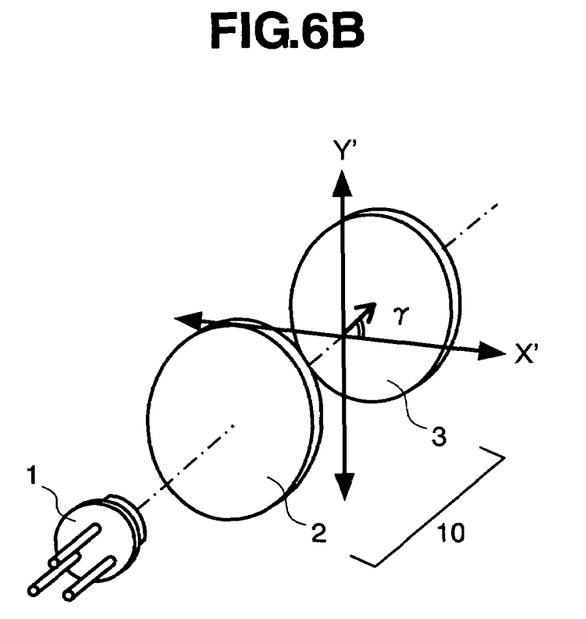

Directional orientation of the astigmatism and the coma aberration need to be considered when lenses 2 and 3 are moved to perform corrections for the astigmatism and the coma aberration. For example, if lens 2 is moved in a direction of θ in an XY plane as shown in FIG. 6A, astigmatism occurs which has a focal line in both the direction of θ and a direction perpendicular thereto. Moving lens 3 in a direction of γ in an X'Y' plane as shown in FIG. 6B causes coma aberration in the direction of γ. For lenses 2 and 3, therefore, the movement directions of θ and γ are desirably set to match the direction of the aberration components to be corrected.

Next, correction of spherical aberration is accomplished by moving lens 2 or 3 in a direction of the optical axis of the light beams. As can be seen by considering shapes of wave fronts indicative of astigmatism and coma aberration (e.g., astigmatism has a shape of a saddle), these two types of aberrations are caused by moving lens 2 or 3 in a direction perpendicular to the optical axis of the light beams. In contrast to this, as can be understood by considering the symmetry of its wavefront shape, spherical aberration can hardly be caused by the above movements and, rather, is caused by, for example, a change in parallelism of the light beams incident on the objective lens. In short, spherical aberration is caused by moving lens 2 or 3 in a direction of the optical axis of the light beams. Since the lenses are moved in different directions in this manner, the correction of spherical aberration that is implemented by moving lens 2 or 3 in a direction of the optical axis of the light beams does not significantly affect the corrections for the astigmatism and the coma aberration.

The spherical aberration can be corrected either by moving only lens 2, by moving only lens 3, or by moving both lenses 2 and 3. The spherical aberration can likewise be corrected by moving both lenses 2 and 3 while maintaining the relative distance therebetween, as shown in FIG. 3.

As described above, according to the present embodiment, the three components of aberration—astigmatism, coma aberration, and spherical aberration—can be corrected with high accuracy, high efficiency, and low costs, by disposing in an optical path of a light beam an aberration-correcting element capable of correcting the three aberration components independently of one another. The fact that the three aberration components can be independently corrected means that the correction of one of the aberration components does not influence other aberrations or means that even if the correction of one aberration component influences other aberration components, the influence is not significant enough to cause recording/reproduction problems.

Second Embodiment

Figure 7A:
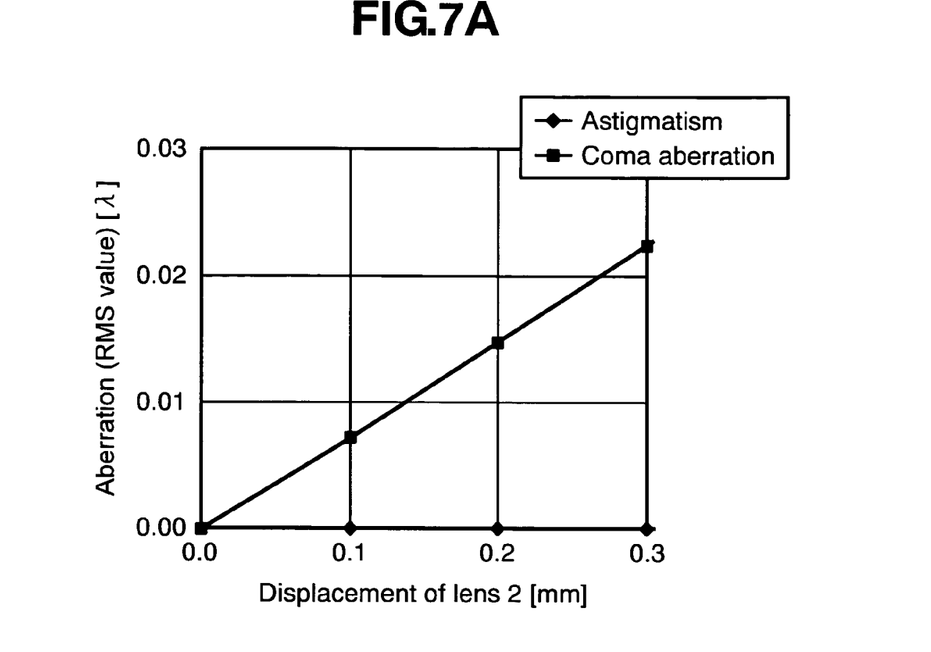
FIGS. 7A and 7B are graphs showing characteristics of lenses 2 and 3 according to a second embodiment.
Figure 7B:
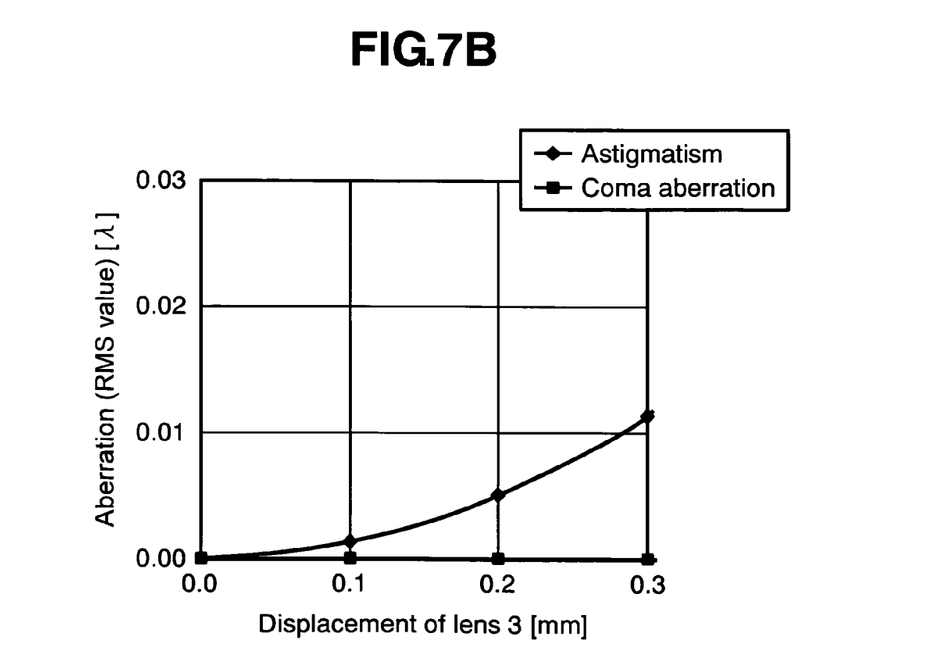

It was described in the first embodiment that lens 2 or 3 is set to make either the astigmatism or coma aberration dominant, respectively, in the wavefront aberrations caused by moving the lens in a plane perpendicular to the optical axis. It is to be understood, however, that the description does not limit the present invention. For example, FIGS. 7A and 7B are graphs that represent a relationship between the amounts of lens displacement and aberrations that are based on the assumption that lens 2 shown in FIG. 3 has an aspheric concave lens surface and a conic constant K equal to +2.4 or that lens 3 has a aspheric convex lens surface and a conic constant K equal to −0.95. That is to say, while, in the first embodiment, lens 2 on the laser light source side is used as an astigmatism-correcting element, and lens 3 on the optical disc side is used as a coma aberration-correcting element, the present second embodiment uses a lens 2 as a coma aberration-correcting element, and a lens 3 as an astigmatism-correcting element. The present embodiment is the same as the first embodiment in that the two types of aberration-correcting elements have characteristics that do not influence the aberrations of each other.

As shown in FIG. 7A, lens 2 may be set such that coma aberrations are dominant with respect to the wave aberrations caused by moving lens 2 in a plane perpendicular to an optical axis. In addition, as shown in FIG. 7B, the lens 3 may be set such that astigmatism is dominant with respect to the wave aberrations caused by moving lens 3 in a plane perpendicular to an optical axis.

If lenses 2 and 3 are set in the above way, astigmatisms of the wavefront aberrations which initially remain in beams of light that have exited from a collimating lens 6, for example, can be corrected by moving lens 2 in a required direction of θ within an XY plane. Similarly, coma aberration can be corrected by moving lens 3 in a required direction of γ within an X'Y' plane.

Spherical aberration can be corrected using essentially the same technique as that of the first embodiment. In the second embodiment, if the amount of lens displacement is the same as that in the first embodiment, an occurrence level of coma aberration due to the lens displacement is set to be relatively high, compared with the occurrence level of coma aberration in the first embodiment. Thus, if the correction of coma aberration is emphasized, the surface of lens 2 or 3 is preferably made aspheric, as in the second embodiment.

Third Embodiment

Alternatively, either the lens 2 or 3 alone may be set so that astigmatism or coma aberration occurs dominantly. For example, FIGS. 8A and 8B are graphs that represent a relationship between the amounts of lens displacement and aberrations that are based on the assumptions that lens 2 shown in FIG. 3 has an aspheric concave lens surface and a cone coefficient K equal to −0.63 and that lens 3 shown in FIG. 3 has a spherical convex lens surface.

Figure 8A:
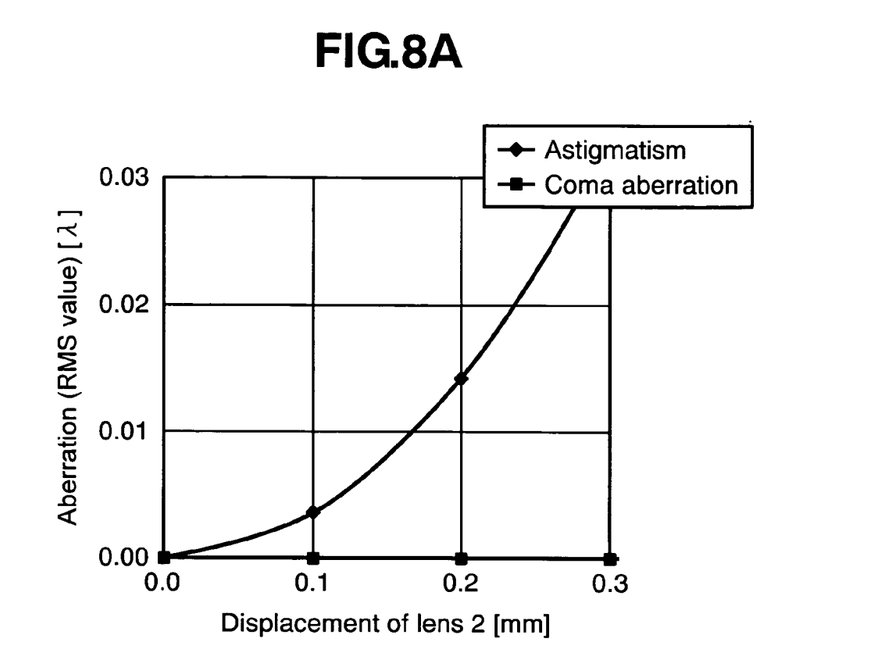
FIG. 8A and 8B are graphs showing characteristics of lenses 2 and 3 according to a third embodiment.
Figure 8B:
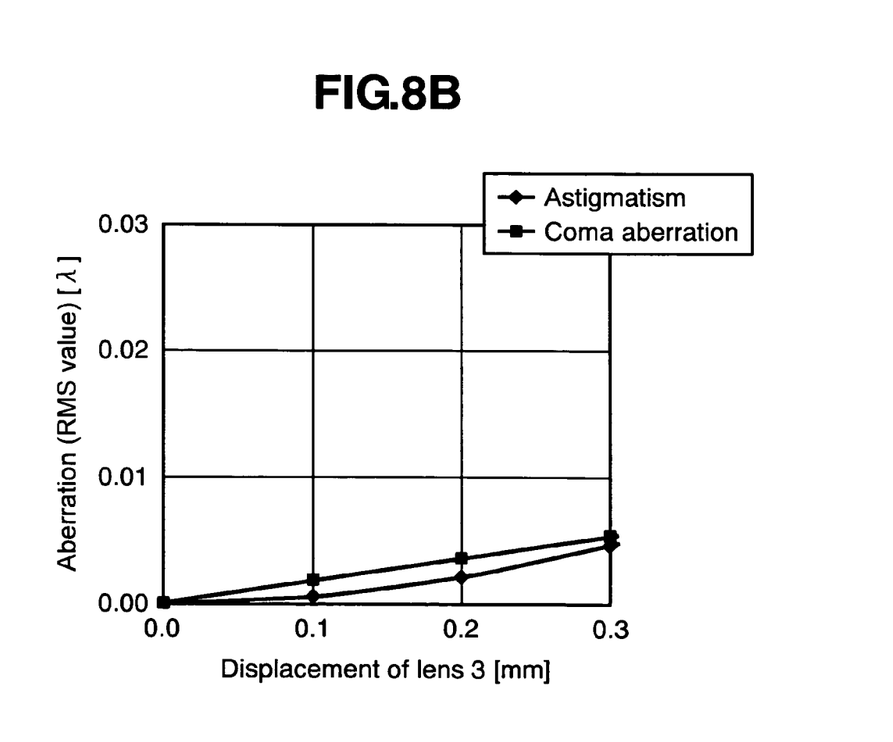
Figure 9:
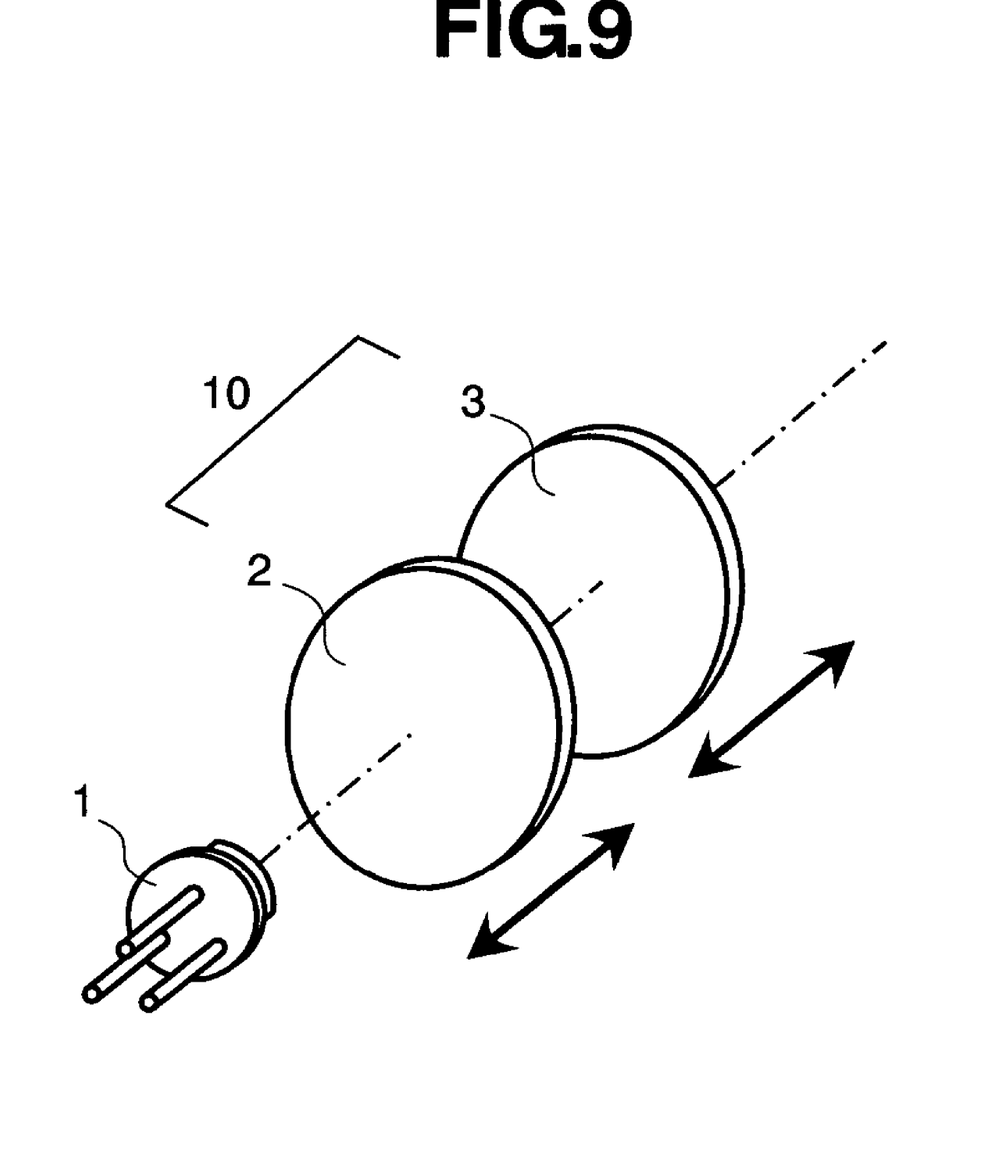
FIG. 9 is a diagram showing position adjustment of lenses 2 and 3 during correction of spherical aberration.

The third embodiment assumes that, as shown in FIG. 8, moving lens 2 results in the occurrence of astigmatism dominant over coma aberration, whereas moving lens 3 results in concurrence of astigmatism and coma aberration with almost equal levels. In this case, consider the operations of correcting the astigmatism and coma aberration which initially remain in beams of light that have exited from a collimating lens 6, for example. First, if the coma aberration is corrected by moving lens 3 in a required direction of γ within an X'Y' plane, the astigmatism occurs simultaneously with the coma aberration, as shown in FIG. 8B. Although superfluous astigmatism is therefore added, the astigmatism including the extra astigmatism caused by the movement of lens 3 can be corrected by means of lens 2 almost without influence on the coma aberration that has already been corrected using lens 3 since the astigmatism occurs dominantly in lens 2 as shown in FIG. 8A. In other words, while in the first and second embodiments, the correcting element for the astigmatism, and the correcting element for the coma aberration do not share characteristics which exert any influence on both of the two types of aberrations, in the third embodiment, either one of the correcting elements has such characteristics.

As described above, in each of the above embodiments, when lens 2 or 3 is position-adjusted in a plane perpendicular to an optical axis, at least one of the two lenses is set to cause either astigmatism or coma aberration to be dominant. If the above conditions are satisfied, the shape of the aberration-correcting element is not limited to the foregoing characteristics and the element may have any shape of a lens surface.

In addition, a position of the aberration-correcting element so disposed is not limited to the position shown in FIG. 1, and may be anywhere in an optical path of divergent light where the light beams that have been emitted from the laser diode are propagated as divergent light. While the aberration-correcting element is disposed close to the laser light source in FIG. 1, this correcting element may be disposed, for example, in the immediate front of collimating lens 6. For example, it is assumed that aberration-correcting element 10 is disposed in the divergent-light optical path, and at a short distance from laser diode 1. As the distance from laser diode 1 is decreased, an effective diameter of the light beams at particular position becomes smaller. Thus, components of the aberration-correcting element can be reduced in size. This provides an advantage in reducing the size of the optical pickup.

Furthermore, although the above embodiments assume the correction primarily of both the astigmatism and coma aberration which initially remain in the light beams that have exited from collimating lens 6, if objective lens 7 initially has wavefront aberrations, the wavefront aberrations may also be corrected.

It is to be understood that each aberration-correcting element is driven independently by each driver.

Moreover, although the above embodiments include one laser light source, the embodiments can also be applied to a plurality of laser light sources. For instance, in an optical pickup which provides support for a CD DVD (low-density optical disc) and a Blu-ray disc (high-density optical disc), the aberration-correcting element may be disposed on both an optical path of light beams for the CD DVD and an optical path of light beams for the Blu-ray disc. In this case, both optical discs can be properly corrected for aberration. In addition, the aberration-correcting element may be disposed only on the optical path of the light beams for the Blu-ray disc. In this case, since the aberration-correcting element so disposed is only for the high-density optical disc in which the requirement for aberration correction is deemed highest, it is possible to reduce the size of an apparatus while providing support for a plurality of types of optical discs.

In addition, for an optical pickup with support for both a Blu-ray disc and an HD DVD, either optical path for the optical discs may include an aberration-correcting element, or both of the optical paths may share one aberration-correcting element in their common path.

The term "dominant" used in each of the above embodiments can be expressed as follows in numeric form. In the case where astigmatism is set so as to occur dominantly, when a Root Mean Square (RMS) value of astigmatism caused by a displacement of the lens in a direction perpendicular to the optical axis is represented by $\Delta$WAS, and a RMS value of coma aberration caused by the foregoing displacement is represented by $\Delta$WCM, the dominant occurrence of the astigmatism is defined by establishment of the relationship in which $\Delta$WCM, for example, is ½ of $\Delta$WAS or less. Similarly, if coma aberration is set so as to occur dominantly, the relationship in which $\Delta$WAS, for example, is ½ of $\Delta$WCM or less is established. In these relationships, since the occurrence level of the coma aberration is slight when the astigmatism is corrected, and since the occurrence level of the astigmatism is slight when the coma aberration is corrected, these two types of aberration components can be corrected independently of each other. Even if the relationship in which one of the RMS values is ½ or less of the other value, in terms of occurrence level, is not established, the relationship in which $\Delta$WAS is equal to or more than $\Delta$WCM may be established when the astigmatism dominantly occurs, or the relationship in which $\Delta$WCM is equal to or more than $\Delta$WAS may be established when the coma aberration dominantly occurs.

It is preferable that the above relational expressions be established for both the astigmatism-correcting lens and the coma aberration-correcting lens. The relational expressions, however, may be established for either one of the lenses. Advantageous results obtained in this case, however, will be limited to a certain extent, compared with those obtained when the expressions are established for both lenses.

In fact, since approximate correction amounts of astigmatism and coma aberration will range from 0.01 to $0.03\pi$ in RMS value within the effective diameter of the objective lens, the foregoing preferable relationships are established if the aberration components which dominantly occur range from 0.01 to $0.03\lambda$ in RMS value.

Also, if the occurrence level of astigmatism or coma aberration caused by moving lenses 2 and 3 is such that proper sensitivity can be obtained, this is convenient for correcting the aberrations. The sensitivity here is defined as the amount of aberration caused by moving lens 2 or 3 by a predetermined distance. For example, in the case where the sensitivity is too low, even if a position adjustment range of the lens 2 or 3 is exceeded, the aberration cannot be corrected. On the contrary, in the case where the sensitivity is too high, if lens 2 or 3 is misaligned due to elapse of time after aberration correction, the amount of aberration is large, which undermines the effectiveness of an initial correction.

The above sensitivity is closely related to the radius of curvature of the lens surface of lens 2 or 3. The sensitivity decreases with an increase in the radius of curvature, and increases with a decrease in the radius of curvature. For these reasons, the radius of curvature of the lens surface of lens 2 or 3 needs to be set considering the above adjustments, but the radius of curvature influences an optical magnification of the optical pickup. That is, the radius of curvature influences the spot size of the light focused on the optical disc, and efficiency of the light beams which reach the optical disc.

According to the present invention, the two lenses 2 and 3 constitute wavefront aberration-correcting element 10, and one of the lenses is a convex lens and the other is a concave lens. If lens 2 is a concave lens and lens 3 is a convex lens, for example, it is possible, by balancing the power of divergence by means of concave lens 2 and the power of convergence by means of the convex lens 3, for the lens powers of lenses 2 and 3 to cancel each other. Needless to say, lens 2 may be a convex lens and lens 3 a concave lens. In the case where lenses 2 and 3 cancel the lens powers of each other, since the respective lens surfaces are capable of having any radius of curvature, an appropriate value can be set for the sensitivity for the astigmatism or coma aberration caused by moving lenses 2 and 3. In the third embodiment, the radius of curvature of the lens surface is set such that the occurrence level of astigmatism or coma aberration caused by moving lens 2 or 3 by 0.1 mm in a direction perpendicular to the optical axis ranges, for example, from several millimeters of $\lambda$ to several tens of millimeters of $\lambda$ in RMS value within the effective diameter of objective lens 7.

Fourth Embodiment

Figure 10:
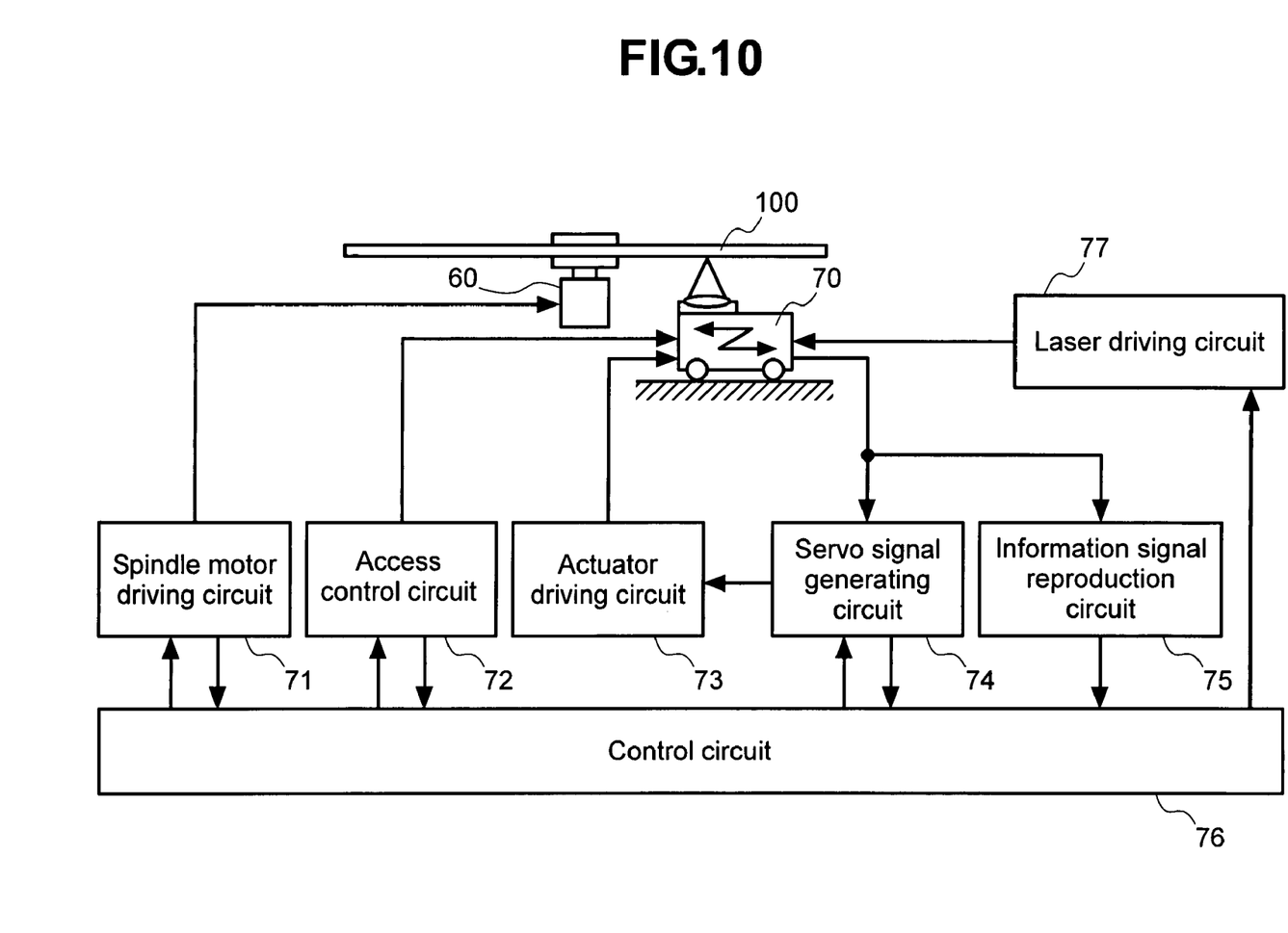
FIG. 10 is a schematic diagram showing an optical disc apparatus of the present invention.

FIG. 10 shows an optical disc apparatus with an optical pickup device according to the fourth embodiment of the present invention. Reference number 70 denotes the optical pickup having the configuration shown in FIG. 1, for example. Optical pickup 70 has a mechanism that can slide the optical pickup in a radial direction of an optical disc 100, and a position of the optical pickup is controlled according to an access control signal from an access control circuit 72.

A laser driving circuit 77 supplies a predetermined laser-driving current to a laser diode within optical pickup device 70, and the laser diode emits a predetermined amount of light beam for reproduction or recording. Laser driving circuit 77 may be embedded in optical pickup device 70.

Signals that have been detected by a photodetector within optical pickup device 70 are sent to a servo signal-generating circuit 74 and an information signal reproduction circuit 75. Servo signal-generating circuit 74 generates a focus error signal and a tracking error signal from the detected signals. The focus error signal and the tracking error signal are then sent to an actuator driving circuit 73 to actuate an actuator of optical pickup 70 and thus to control a position of an objective lens.

In information signal reproduction circuit 75, information signals that have been recorded on optical disc 100 are reproduced from the detected signals. The signals which have been obtained in servo signal generating circuit 74 and information signal reproduction circuit 75 are in part sent to a control circuit 76. Control circuit 76 is connected with laser driving circuit 77, access control circuit 72, actuator driving circuit 73, a spindle motor driving circuit 71, and the like. The circuits connected to control circuit 76 respectively control the amount of light beam to be emitted from the laser diode within optical pickup device 70, control an access direction and an access position, or control the speed of a spindle motor 60 and the like.

As described in the first to third embodiments, an optical disc apparatus with high reproduction or recording performance can be achieved by mounting in a disc apparatus an optical pickup which includes a wavefront aberration correcting element 10 to reduce wavefront aberrations of light beams focused on an optical disc.

The optical pickup mounted in the optical disc apparatus may be any one of the optical pickups described above.

As described heretofore, using any optical pickup and optical disc apparatus described in the above embodiments makes it possible to reduce aberrations of light beams focused on an optical disc.

It should be further understood by those skilled in the art that, although the foregoing description has been made of embodiments of the invention, the invention is not limited thereto and various changes and modifications may be made without departing from the spirit of the invention and the scope of the appended claims.

What is claimed is:

1. An optical pickup comprising: a laser light source for irradiating an optical disc with a light beam; an objective lens for focusing the light beam emitted from the laser light source on the optical disc; a first lens for correcting astigmatism; a second lens for correcting coma aberration; and a photodetector for receiving the light beam reflected from the optical disc; wherein the astigmatism and the coma aberration are corrected independently of each other by using the first lens or the second lens, wherein at least one of: a Root Mean Square (RMS) value of the astigmatism that occurs when the first lens is moved in a direction perpendicular to an optical axis is greater than an RMS value of the coma aberration, and the RMS value of the coma aberration that occurs when the second lens is moved in a direction perpendicular to the optical axis is greater than the RMS value of the astigmatism.

2. An optical pickup comprising: a laser light source for irradiating an optical disc with a light beam; an objective lens for focusing the light beam emitted from the laser light source on the optical disc; a first lens for correcting astigmatism; a second lens for correcting coma aberration; and a photodetector for receiving the light beam reflected from the optical disc, wherein the astigmatism and the coma aberration are corrected independently of each other by using the first lens or the second lens, wherein when Root Mean Square (RMS) values of the astigmatism and coma aberration that occur when the first lens is moved in a direction perpendicular to an optical axis are represented by $\Delta WAS1$ and $\Delta WCM1$, respectively, and RMS values of the astigmatism and coma aberration that occur when the second lens is moved in a direction perpendicular to the optical axis are represented by $\Delta WAS2$ and $\Delta WCM2$, respectively, a relationship in which $\Delta WAS1$ is at least $\Delta WCM1 \times 2$, or a relationship in which $\Delta WCM2$ is at least $\Delta WAS2 \times 2$, is established.

3. The optical pickup according to claim 2, wherein when a value of $\Delta WAS1$ is at least $0.01\lambda$ and not greater than $0.03\lambda$, $\Delta WCM1$ is not greater than ½ of $\Delta WAS1$, or when a value of $\Delta WCM2$ is at least $0.01\lambda$ and not greater than $0.03\lambda$, $\Delta WAS2$ is equal to or less than ½ of $\Delta WCM2$.

4. The optical pickup according to claim 1, wherein spherical aberration of the light beam is corrected by moving at least either the first or second lens in a direction of the optical axis.

5. The optical pickup according to claim 1, wherein spherical aberration of the light beam is corrected by moving both the first and second lenses in a direction of the optical axis while maintaining a relative distance between the first and second lenses.

6. The optical pickup according to claim 1, wherein either the first or second lens comprises a convex lens and the other lens comprises a concave lens.

7. The optical pickup according to claim 1, wherein the first lens and the second lens are arranged in an optical path of divergent light.

8. The optical pickup according to claim 1, wherein the first lens and the second lens are arranged immediately adjacent the laser light source.

9. An optical pickup comprising: a laser light source for irradiating an optical disc with a light beam; an objective lens for focusing the light beam emitted from the laser light source on the optical disc; a first lens for correcting astigmatism; a second lens for correcting coma aberration; and a photodetector for receiving the light beam reflected from the optical disc, wherein the astigmatism and the coma aberration are corrected independently of each other by using the first lens or the second lens, wherein: a shape of the first lens is represented using an expression of $Z1\ (h)=c1h2/[1\{1-(K1+1)c12h2\}0.5]$ (h is a distance from an optical axis, $c1=0.22$, $K1=-0.63$); and a shape of the second lens is represented using an expression of $Z2\ (h)=c2h21[1\{1-(K2+1)c22h2\}0.5]$ (h is a distance from the optical axis, $c2=0.14$, $K2=+0.67$).

10. An optical pickup comprising: a laser light source for irradiating an optical disc with a beam of light; an objective lens for focusing the light beam emitted from the laser light source on the optical disc; a first lens for correcting astigmatism; a second lens for correcting coma aberration; and a photodetector that receives the light beam reflected from the optical disc; wherein the first lens has characteristics which act on the astigmatism, but do not substantially act on the coma aberration when the first lens is moved perpendicularly to an optical axis, wherein a Root Mean Square (RMS) value of the astigmatism that occurs when the first lens is moved in a direction perpendicular to the optical axis is greater than an RMS value of the coma aberration, wherein the RMS value of the coma aberration that occurs when the second lens is moved in a direction perpendicular to the optical axis is greater than the RMS value of the astigmatism.

11. An optical pickup comprising: a laser light source for irradiating an optical disc with a beam of light; an objective lens for focusing the light beam emitted from the laser light source on the optical disc; a first lens for correcting astigmatism; a second lens for correcting coma aberration; and a photodetector that receives the light beam reflected from the optical disc, wherein the first lens has characteristics which act on the astigmatism, but do not substantially act on the coma aberration when the first lens is moved perpendicularly to an optical axis, wherein when Root Mean Square (RMS) values of the astigmatism and coma aberration that occur when the first lens is moved in a direction perpendicular to an optical axis are represented by $\Delta$WAS1 and $\Delta$WCM1, respectively, and RMS values of the astigmatism and coma aberration that occur when the second lens is moved in a direction perpendicular to the optical axis are represented by $\Delta$WAS2 and $\Delta$WCM2, respectively, a relationship in which $\Delta$WAS1 is at least $\Delta$WCM1×2, or a relationship in which $\Delta$WCM2 is at least $\Delta$WAS2×2, is established.

12. The optical pickup according to claim 11, wherein when a value of $\Delta$WAS1 is at least 0.01$\lambda$ and not more than 0.03$\lambda$, $\Delta$WCM1 is not greater than ½ of $\Delta$WAS1, or when a value of $\Delta$WCM2 is at least 0.01 $\lambda$ and not more than 0.03$\lambda$, $\Delta$WAS2 not greater than ½ of $\Delta$WCM2.

13. The optical pickup according to claim 10, wherein spherical aberration is corrected by moving at least one of the first and second lenses in a direction parallel to the optical axis.

14. The optical pickup according to claim 10, wherein spherical aberration is corrected by moving both the first and second lenses in a parallel direction with respect to the optical axis while maintaining a relative distance between the first and second lenses.

15. The optical pickup according to claim 10, wherein one of the first and second lens is a convex lens and the other is a concave lens.

16. The optical pickup according to claim 10, wherein the first lens and the second lens are arranged in an optical path of divergent light.

17. The optical pickup according to claim 10, wherein the first lens and the second lens are arranged immediately in front of the laser light source.

18. An optical pickup comprising: a laser light source for irradiating an optical disc with a beam of light; an objective lens for focusing the light beam emitted from the laser light source on the optical disc; a first lens for correcting astigmatism; a second lens for correcting coma aberration; and a photodetector that receives the light beam reflected from the optical disc, wherein the first lens has characteristics which act on the astigmatism, but do not substantially act on the coma aberration when the first lens is moved perpendicularly to an optical axis, wherein: a shape of the first lens is represented by $Z1(h) = c1h2/[1\{1-(K1+1)c12h2\}0.5]$ (where h is a distance from the optical axis, c1=0.22, K1=−0.63); and a shape of the second lens is represented by $Z2(h) = c2h2/[1\{1-(K2+1)c22h2\}0.5]$ (h is a distance from the optical axis, c2=0.14, K2=+0.67).

* * * * *